(12) United States Patent
Xiao

(10) Patent No.: US 7,146,386 B2
(45) Date of Patent: Dec. 5, 2006

(54) SYSTEM AND METHOD FOR A SNAPSHOT QUERY DURING DATABASE RECOVERY

(75) Inventor: Wei Xiao, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 283 days.

(21) Appl. No.: 10/812,188

(22) Filed: Mar. 29, 2004

(65) Prior Publication Data

US 2005/0216462 A1    Sep. 29, 2005

(51) Int. Cl.
*G06F 17/30* (2006.01)
(52) U.S. Cl. ............... 707/202; 707/8; 707/103 R; 707/203; 709/217; 715/511
(58) Field of Classification Search .......... 707/8, 707/103 R, 104.1, 202, 204, 3, 203; 709/217; 715/511, 522, 523; 718/101
See application file for complete search history.

(56) References Cited

U.S. PATENT DOCUMENTS

| | | | | |
|---|---|---|---|---|
| 5,327,556 | A | * | 7/1994 | Mohan et al. .................. 707/8 |
| 5,701,480 | A | * | 12/1997 | Raz ............................ 718/101 |
| 5,752,026 | A | * | 5/1998 | Fortier ................... 707/103 R |
| 6,247,023 | B1 | * | 6/2001 | Hsiao et al. ................ 707/202 |
| 6,564,215 | B1 | * | 5/2003 | Hsiao et al. .................... 707/8 |
| 7,076,508 | B1 | * | 7/2006 | Bourbonnais et al. ...... 707/202 |

FOREIGN PATENT DOCUMENTS

WO   WO 2005/103880 A2   11/2005

OTHER PUBLICATIONS

Mohan, C. et al., "Transaction Management in the R* Distributed Database Management System", ACM Transactions on Database Systems, vol. 11, No. 4, Dec. 1986, pp. 378-396.*

Ng, Pui, "A Commit Protocol for Checkpointing Transactions", Proceedings of the Seventh Symposium on Reliable Distributed Systems, Oct. 10-12, 1988, pp. 22-31.*

Rahm, Erhard, "Recovery Concepts for Data Sharing Systems", Digest of Papers of the Twenty-First International Symposium on Fault-Tolerant Computing, 1991 FTCS-21., Jun. 25-27, 1991, pp. 368-375.*

Lahiri, T. et al., "Fast-Start:Quick Fault Recovery in Oracle", *Proceedings of the 2001 ACM SIGMOD International Conference on Management of Data*, 2001, 593-598.

Lomet, D. et al., "Efficient Transparent Application Recovery in Client-Server Information Systems", *Proceedings of the 1998 ACM SIGMOD International Conference on Management of Data*, 1998, 460-471.

Mohan, C. et a.l., "ARIES: A Transaction Recovery Method Supporting Fine-Granularity Locking and Partial Rollbacks Using Write-Ahead Logging", *ACM Transactions on Database Systems*, 1992, 17(1), 94-162.

* cited by examiner

*Primary Examiner*—Shahid Alam
(74) *Attorney, Agent, or Firm*—Woodcock Washburn LLP

(57) ABSTRACT

A method of performing a snapshot query in a database undergoing recovery allows access to the database during rollback or undo operations. The method includes allowing the query to detect whether a redo lock is present on a data item and if so, waiting until subsequent rollback operations release the lock. If another user has placed an exclusive lock on a data item of the database, the query may continue by reading a version of the data item form the version store. In an embodiment where a mirror database is used for recovery, the constant redo operations have an associated version store. Upon failover to the mirror database, queries may begin during the undo phase of recovery by allowing a query to read the version store of redo operations.

10 Claims, 7 Drawing Sheets

400

SYSTEM AND METHOD FOR A SNAPSHOT QUERY DURING DATABASE RECOVERY

REFERENCE TO CO-PENDING APPLICATIONS

The following reference has some subject matter in common with the current application:

Co-Pending patent application Ser. No. 10/602,283 filed Jun. 23, 2003 entitled "RESYNCHRONIZATION OF MULTIPLE COPIES OF A DATABASE AFTER A DIVERGENCE IN TRANSACTION HISTORY" commonly assigned with the present application.

FIELD OF THE INVENTION

This invention relates in general to the field of computer databases. More particularly, this invention relates to access to a database during a recovery operation.

BACKGROUND OF THE INVENTION

Modern business may rely heavily on databases to keep vital records such as clients, services, suppliers, billing records, and inventory. When database hardware or software fails, it becomes imperative to recover the database so that operations with the database may continue. In very large databases, recovery may be lengthy and costly. Generally, access to the database may be limited during recovery because existing techniques do not provide a method for access during the recovery phase.

FIG. 1 depicts the recovery timeline 100 of a database. The three stages of a recovery are the analysis phase 105 (A to B), the redo phase 110 (B to C), and the undo phase 115 (C to D). The analysis phase 105 generally includes reading and analysis of the log file associated with the database. Often, a log file is generated concurrent with database operations, for example, during a database update operation, the log file records transactions that occur against the database. Those transactions may start a read operation and may end with a write operation. However, a database event, such as a disk crash may occur before the written data is committed into the database. Thus, a log file may contain both committed and uncommitted transactions. The analysis phase 105 of a database recovery typically includes reading all of the transactions on the log file.

The redo phase 110 of the database recovery timeline 100 compares the log file entries with the database. If a transaction in the log file is represented in the database, the next entry in the transaction log file is examined. If the transaction present in the log file is not in the database, the redo phase re-applies the transaction log to the database file to record the transaction as part of the recovery process. However, the re-entered transaction may be incomplete because it was never committed into the database. Transactions that are already in the database and do not need to be re-entered may also be incomplete.

By selectively removing the uncommitted transactions from the database, the database reconstruction may result in a transactionally consistent form after the recovery operation. The undo phase 115 of database recovery rolls back the transaction from the database in those instances where the log file has no record of a commitment of the transaction. Consequently, uncommitted transactions are removed so that the database recovery may result in a consistent set of committed transactions.

Some prior art systems which use the database recovery scheme of FIG. 1 cannot allow access to the database until after the undo phase 115. That is, prior art systems can not allow access to the database until all recovery operations are completed. Prior art systems only allow access after point D in the recovery timeline 100.

Thus, there is a need for an architecture and method that may allow for an earlier entry for accessibility into a database recovery timeline. The present invention addresses the aforementioned needs and solves them with additional advantages as expressed herein.

SUMMARY OF THE INVENTION

The invention includes a method of allowing access to database during recovery of the database. In one embodiment, a method includes reading a log file and determining which transactions require entry into the database as part of recovery operation. The incomplete transactions assert a redo lock which remains asserted until the rollback (undo) operation completes. According to an aspect of the invention, access to the database may occur during the undo phase of recovery provided the query tests the locks of the data items requested in the query. If the data items have redo locks, then the query waits until those data item have their redo locks removed. Other locks, such as regular write type locks, do not delay access as the query may read a previous version of the queried data.

In another embodiment of the invention, access may be given to a query while a database is in the recovery phase if unentered transactions generate versions as they are entered. During the rollback phase of recovery, access by a query may be achieved by giving the query access to the version store. Version store is a place to store versions of database items. Commit time on queried data items may be checked to direct the query to retrieve a locked data item from a version store. Otherwise, a queried item may be retrieved from the database.

In one embodiment of the invention, a mirror database system used for recovery may grant access to the mirror database during rollback recovery operations due to the versioning aspect of the invention where locked data item have a previous version of the data available for a query. This aspect of early access to the database provides availability, concurrency and other advantages as expressed herein.

BRIEF DESCRIPTION OF THE DRAWINGS

The foregoing summary, as well as the following detailed description of preferred embodiments, is better understood when read in conjunction with the appended drawings. For the purpose of illustrating embodiments of the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

Figure 1:
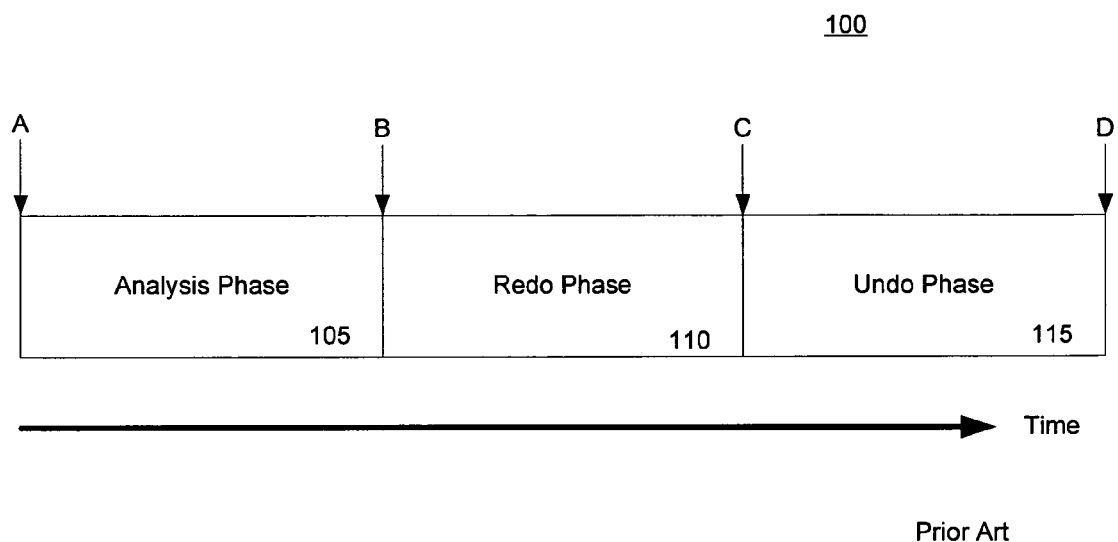
FIG. 1 is a timeline of a typical database recovery.

An embodiment of the invention allows access to a database during the undo phase of recovery. Referring to FIG. 1, prior art systems allow recovery only after point D in time. Some embodiments of the present invention realize accessibility for queries at point C in time. This earlier accessibility is possible through the use of a technique employing row level versioning and row level locking. Using this technique, users requiring access to the database during the undo phase may read transactionally consistent data from the database by noting the lock on the data and taking data from either the database or from a version store as appropriate.

In another embodiment, aspects of the invention allow a method to gain access to a mirror database during failover operations. In this embodiment, a mirror database is used to provide a database recovery mechanism upon failure of a primary database. Access to the mirror database during recovery is facilitated by using the version store aspects of the invention. This method allows a user to gain access to the mirror database earlier in time that prior art databases.

After discussing an exemplary configuration using FIG. 2, exemplary methods and embodiments will be discussed in conjunction with FIGS. 3–6. An exemplary computing environment is also discussed in conjunction with FIG. 7.

EXEMPLARY EMBODIMENTS OF THE INVENTION

An advancement in the recovery of databases using a mirror database recovery scheme is disclosed in co-pending patent application Ser. No. 10/602,283 filed Jun. 23, 2003 entitled "RESYNCHRONIZATION OF MULTIPLE COPIES OF A DATABASE AFTER A DIVERGENCE IN TRANSACTION HISTORY" commonly assigned with the present application. This commonly assigned patent application discloses a method and system for accommodating a mirror database and is hereby incorporated by reference in its entirety.

In one embodiment of the present invention, row level versioning is advantageously used to enable a database snapshot or view of the database at a point in time. Also referred to as snapshot isolation, row level versioning enhances database application concurrency by keeping multiple row versions in a user table so that the readers and writers of the information do not block one another. Row level versioning provides for the storing of a version of database values as operations on the database, such as accesses by others for update or maintenance purposes, such that a version of the data may be read by others. A snapshot query refers to a read only query that returns a consistent set of changes made by other transactions in the database up to a particular point in time. A snapshot query allows a transactional consistent view of the database so that a query against the database is possible without blocking update transactions.

In some prior art systems, row level locks may be asserted against a database table if a transaction changes a row. An example of one type of lock would be a lock asserted by a redo operation against a row. A second example of a lock may a lock asserted by any other user transaction that has gained access to the row. Normally, the row lock is maintained in an asserted state until the transaction is complete and the writer commits.

Row level versioning allows queries to be performed against a database that would normally not allow such access. Row level versioning allows the reader of a database to get to the previously committed value of the row, so concurrency may be increased in the system. It is therefore advantageous for the database system to keep old versions of a row when it is updated. Row level versioning provides the reader of the transaction with a transaction consistent snapshot of the database thus permitting meaningful queries. The snapshot of the database may be defined as the state of the database if all active transactions other than the reader are ignored when the reader transaction starts.

Versioning works by allowing the update transaction keep the old versions of the data so that a snapshot of the database can be constructed from the old versions. When a record in a table or index is updated, the new record may be stamped with the transaction sequence number of the transaction that is doing the update. The old version of record may be stored in a version store, and the new record may contain a pointer to the old record in the version store. Old records in the version store may contain pointers to even older versions. All the old versions of a particular record may be chained in a linked list. By following the link pointer a couple of times to reach the right version for a particular snapshot of the database, the correct version may be reached.

Figure 2:
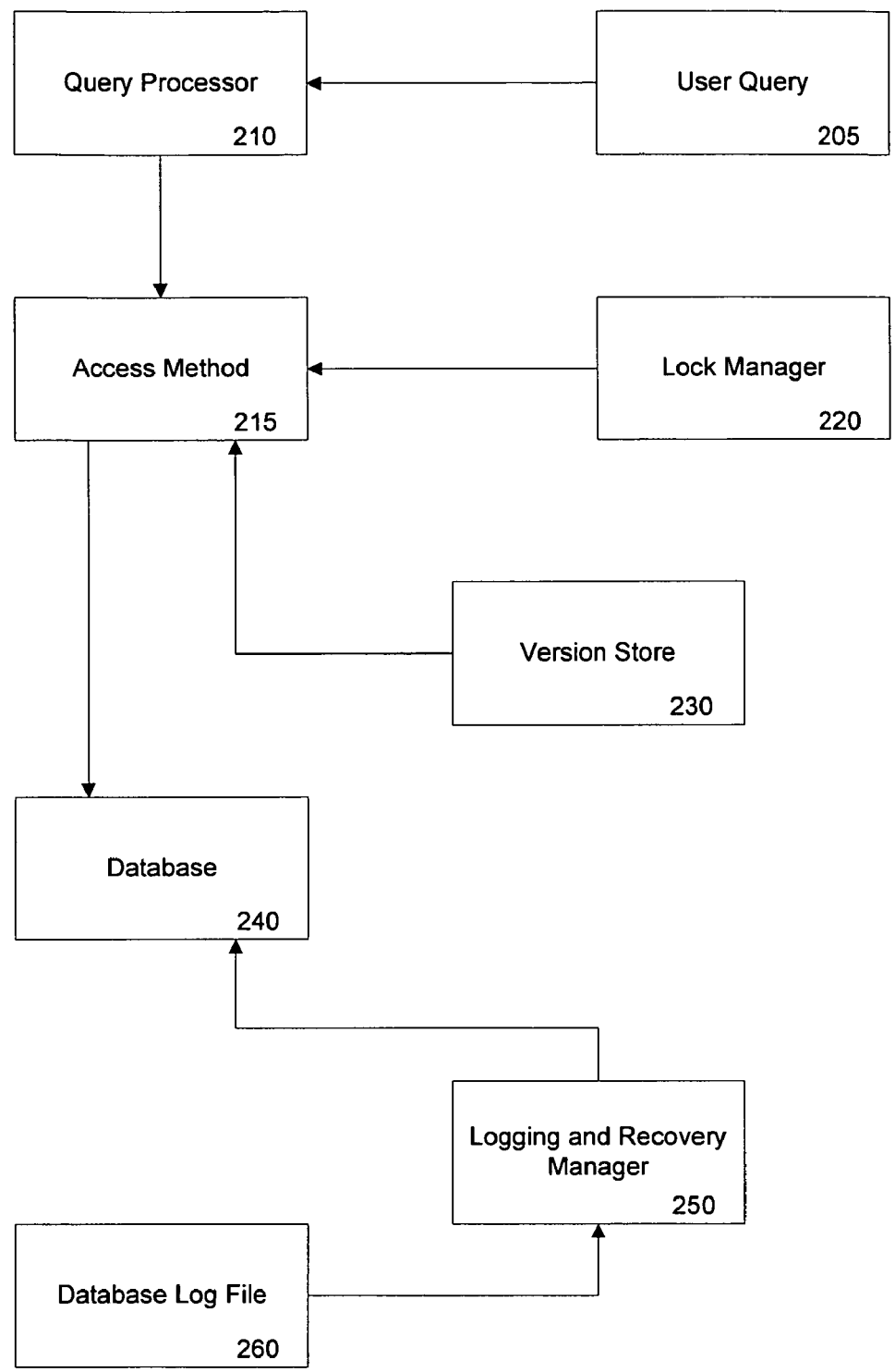
FIG. 2 is a block diagram depicting an architecture of a first embodiment of the present invention.

FIG. 2 illustrates a block diagram 200 showing the software components which may be used to implement aspects of the present invention. A user query 205 serves as an input to the query processor 210. The query processor calls the access method 215 component to perform an access, such as a read or write, of the database 240. The access method may also read and analyze locks placed on rows of database data from the lock manager 220. The access method also receives version records from the version store 230 in order to assist in the fulfillment of an access of the database 240.

The components of FIG. 2 may be active in the undo phase of recovery where uncommitted transactions are being rolled back to produce a transaction consistent database state. The logging and recovery manager 250 performs the redo as well as undo operations on the database 240. The logging and recovery manager receives transaction information including both committed and uncommitted transactions from the data base log file 260.

Figure 3:
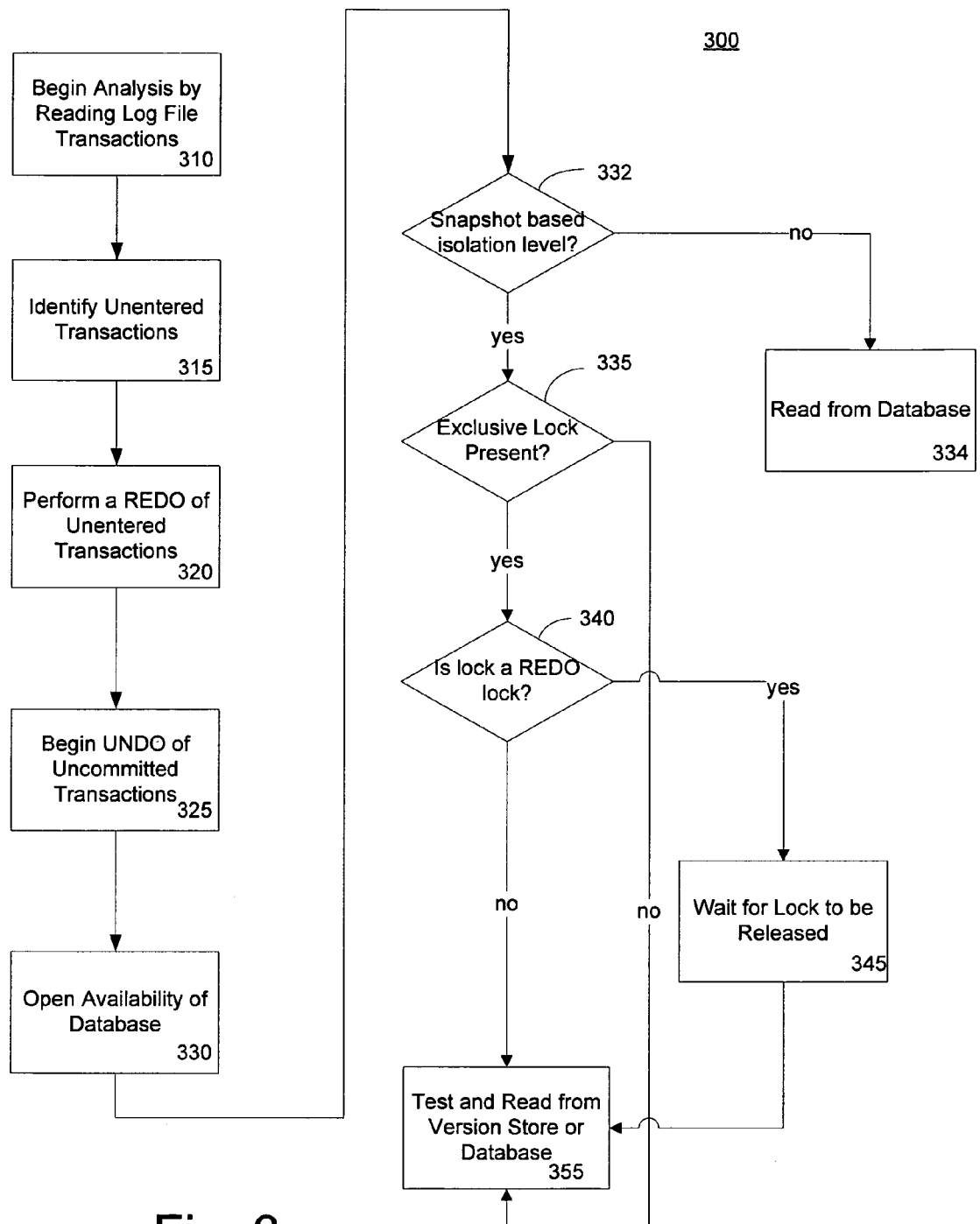
FIG. 3 is a flow diagram depicting a method of the lock/release aspect of the present invention.

FIG. 3 is a flow diagram representing a method 300 of the present invention which allows greater availability to a database while the database is in a recovery mode. In recovery, a database may begin the analysis phase by reading the log file transactions (step 310). In the analysis phase, incomplete transactions are identified. Incomplete transactions lack a commit log record. As part of the redo phase, unentered transactions are identified in the log file (step 315). Unentered transactions are those transactions in the log file that are missing from or not reflected in the database. The detected unentered transactions may be reentered into the database as part of a recovery scenario. In one embodiment, a SQL standard database may be used. Typically, the reentry of transactions may be performed by a series of one or more redo instructions. The redo instructions insert the transactions into the database that are reflected in the log file but that are not present in the database prior to recovery (step 320). During this redo phase, locks on the rows, pages, tables or indexes of the database may be asserted by the redo operation for incomplete (uncommitted) transactions until these transactions rollback.

The last phase of a recovery scheme removes those transactions that are uncommitted in order to produce a transaction consistent database. In a SQL environment, the removal of the selected uncommitted transactions may be accomplished via one or more undo instructions. Step 325 of FIG. 3 indicates that the undo phase may begin after the redo phase is completed. Normally, this undo phase of recovery would have to be completed before access is granted to the database for any read or write operation. However, the present invention advantageously may permit access to the database at the beginning of the undo phase (step 330).

Access to the database during the undo phase may be initiated by a query to a row, page, index, table or other structure within in the database. This query may operate under locking based isolation level or snapshot based isolation level. Isolation level is an attribute of the query that dictates the concurrency behavior of the query and may result in different result sets for the query when there are concurrent updates affecting the result sets. Step 332 tests if the query is a snapshot based query or a locking based query. If the query is a locking based query, the desired query data may be read from the database (step 334) when it is available. However, if the query is a snapshot based query, then the step 335 may be entered. It should be noted that step 332 may be omitted if the query is known to be a snapshot based query a-priori.

The steps 335–355 in FIG. 2 depicts an exemplary flow involving a query operation under snapshot based isolation levels. Using an aspect of the invention, row level locks and database versioning, discussed above, may be used in association with the present method. In processing the query, the method 300 checks for the presence of exclusive or write type locks (step 335) that may be placed on database elements. If no exclusive or write type lock is present, a read of the available relevant data may be performed (step 355). Note that a shared or read type lock may be present. In that instance, the step 335 decision fails and allows a test and read from step 355.

Step 355 involves a test as to which source of data is to be read. In the snapshot query environment, data is preferably both time consistent as well as transaction consistent. The implied test compares the start time of the query with the commit time of the data being accessed. If the start time is before the commit time, the version store of the data should be used. Otherwise, the data is committed, is transactionally and time consistent and the data may be safely read from the database. Step 355 may thus include a read from either the database or a version store of a database value depending on the state of consistency of the data. If data is read from the version store, the right version is chosen among several committed versions depending on the state of consistency of the data.

If a write type lock is present, the lock may be tested for lock type (step 340). If the lock is acquired during the redo phase, then the data protected by the lock may not have a version store value to read. The access may then be delayed by waiting (step 345) for the redo lock to be released during the undo phase of the database recovery. Once the redo lock is released, a test and data read may occur (step 355). Once again, step 355 may include a read from either the database or a version store of a database value. If a redo type lock is not asserted, then an immediate data read may be performed (step 355). This data read allows an access to continue despite the presence of some types of locks on the row, page, table or index of the database. An example of some types of lock would be an exclusive (write type) lock asserted by another user or query. Such an exclusive lock prevents multiple users or queries from accessing the same data simultaneously. It is worth noticing that there could be multiple users or queries waiting for the release of the redo lock, and among those users, the ones that will perform version read (also known as operating under snapshot based isolation levels) have priority over those that will need to acquire shared locks in order to access data. The later types of users are known as operating under locking based isolations levels.

Figure 4:
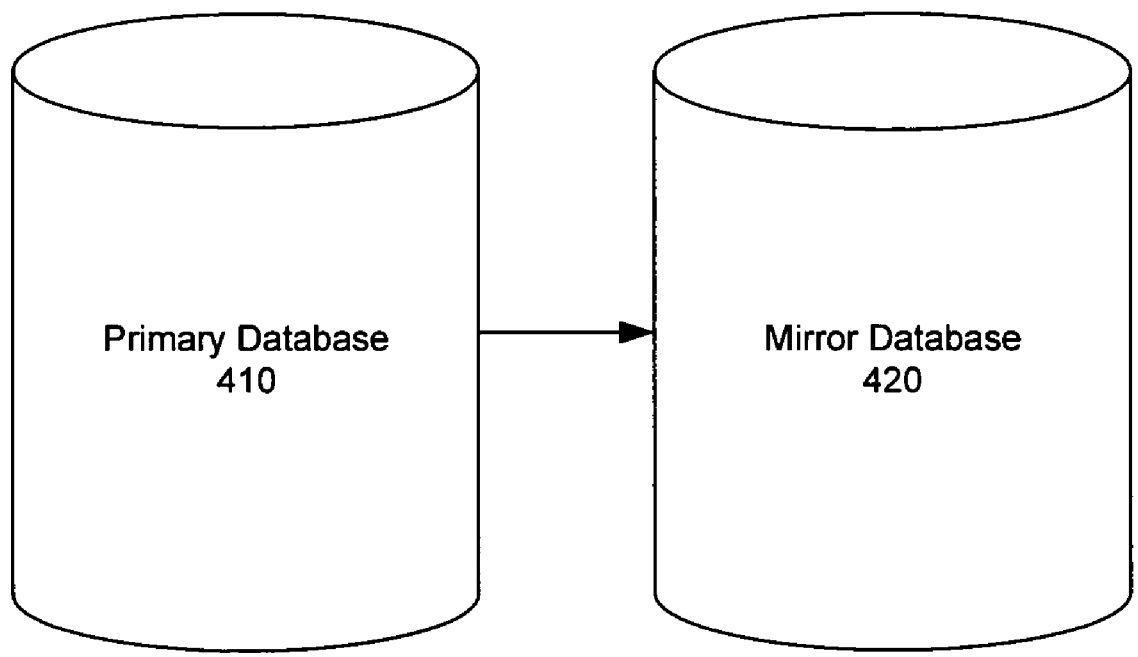
FIG. 4 is a block diagram depicting a mirror database embodiment of the present invention.
Figure 4:
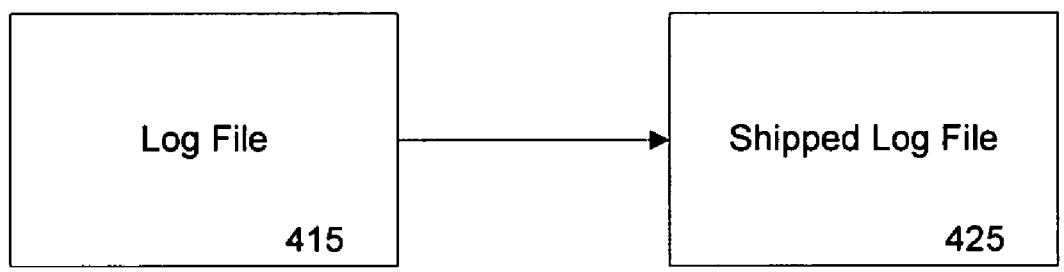

In another embodiment of the invention, aspects of the invention may be advantageously used in conjunction with a mirror database. A mirror database may be used to serve as a backup database in the event of a failure in the primary database. FIG. 4 depicts a system 400 where a primary database 410 has a corresponding mirror database 420 for high-availability purposes. An aspect of the system 400 is the primary database log 415 is constantly being shipped to the mirror database site such that a shipped log file 425 may update the mirror database 420 to reflect the transactions of the primary database 410.

It is an aspect of the system 400 of FIG. 4 that the mirror database 420 is performing constant redo operations to add in the transactions received by the shipped file log 425. While in the redo phase, the mirror database 420 is also constantly acquiring appropriate locks on the rows, pages, tables and indexes of updated database elements. If, in such a system, versioning is applied such that a version store is used to store versions of the transaction data as it is being updated, then other aspects of the present invention may be applied.

Figure 5:
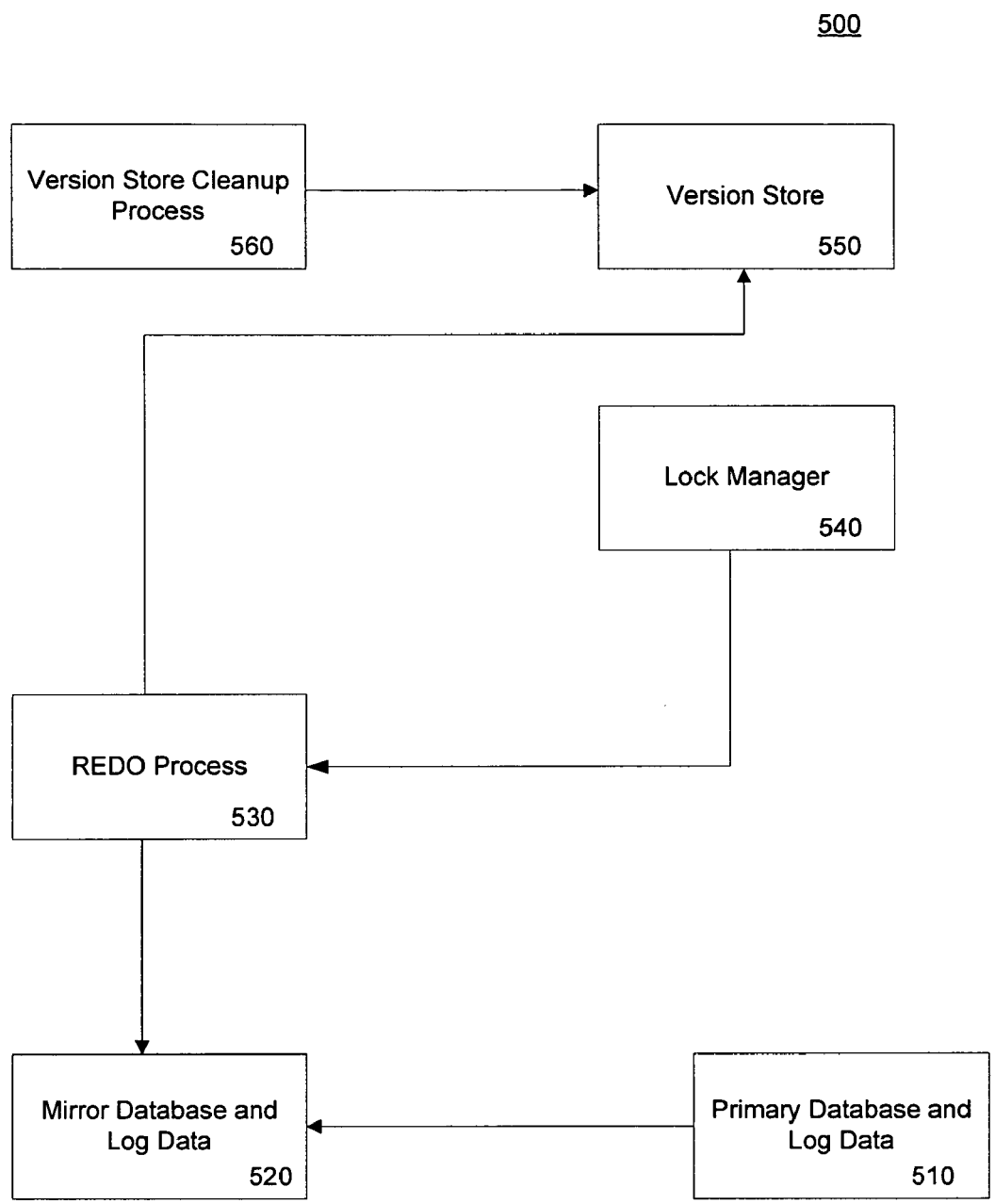
FIG. 5 is a block diagram depicting an architecture of a second embodiment of the present invention.

FIG. 5 depicts a block diagram of a system 500 which embodies aspects of the present invention. Transaction log records are shipped from the primary database 510 to the mirror database 520. Assuming a SQL environment, the redo process 530 performs redo instructions on the mirrored database 520. The redo process also generates versions in the version store 550, and gets locks from the lock manager 540 at the same time. The versions generated for the mirrored database during redo can be removed as soon as the transaction that generated the version ends. There is also a background version store cleanup process 560 that works on the version store 550 to remove unnecessary versions to free up and reuse the space consumed by the version records. In one embodiment, the version records may be stored on disk and may be accessed using a buffer pool as in-memory cache. The architecture of FIG. 5 supports a method of permitting access to the mirror database during a recovery.

Figure 6:
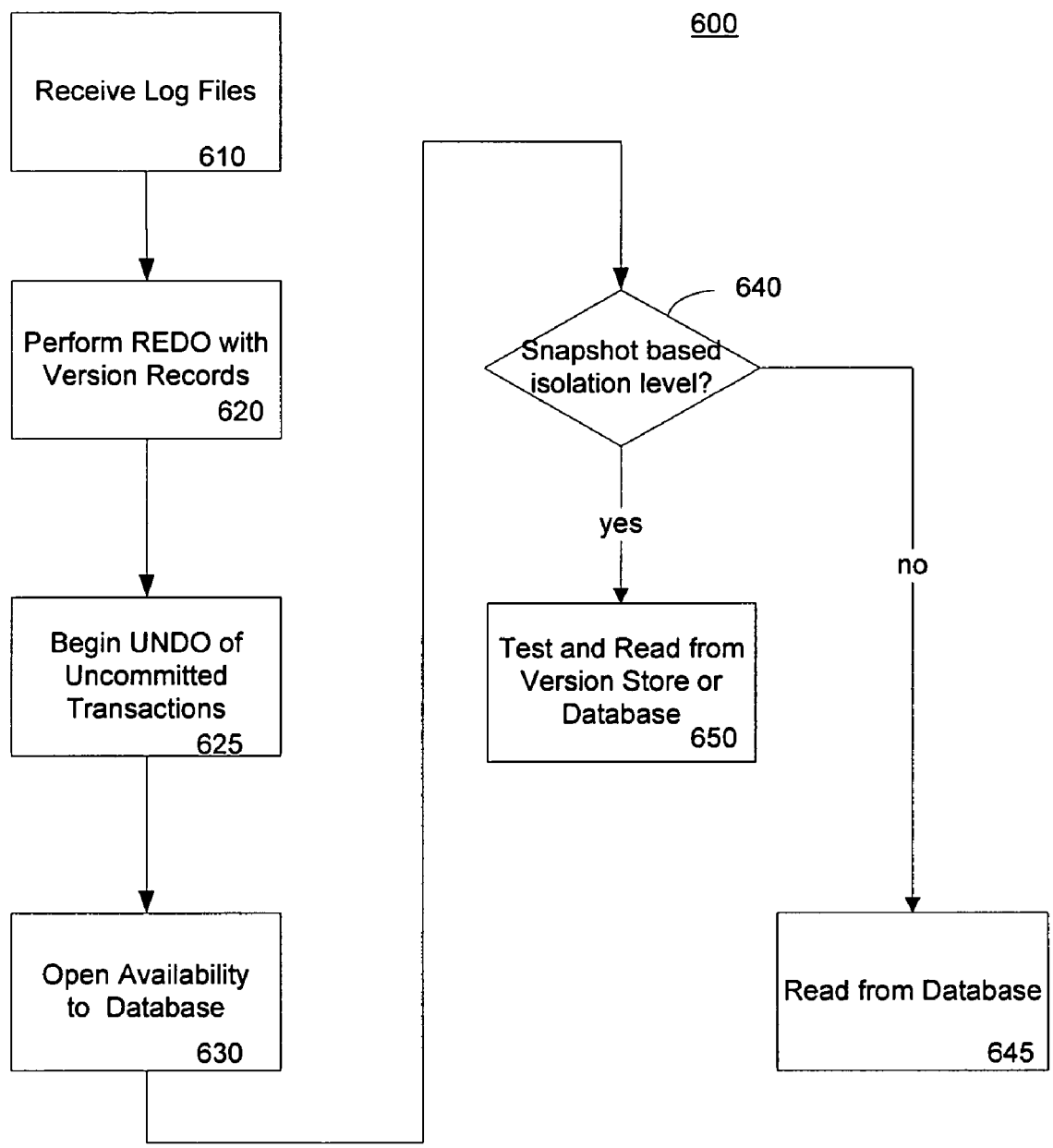
FIG. 6 is a flow diagram depicting a method of the redo version read aspect of the present invention.

FIG. 6 depicts an exemplary method of the current invention which supports the early grant of access to a database during a recovery operation. In one embodiment, the recovery operation may be performed on a mirror database that is being recovered after failover of a primary database. In this embodiment, the redo operations of the mirror database may end at failover with the reception of the last of update from the primary database and undo operations may commence. Aspects of the present invention may then allow access during the undo recovery operations advantageously allowing access before earlier in time than prior art systems.

FIG. 6 depicts a flow diagram of a method 600 of the present invention. The method 600 begins with the receipt of log files by a database (step 610). Unentered transactions are inserted into the database. In a SQL environment, the insertion operation may use redo instructions. During the redo operations, version records are made according to aspects of the invention and appropriate redo locks are asserted (step 620). When redo operations cease, as when the unentered transactions from the log are entered, the undo phase of the database recovery may begin (step 625).

At this point, the method 600 may permit access to the database (630) by virtue of the versioning aspects of the invention. The access may be a query against the database. The method tests (step 640) if the query operates under the snapshot based isolation levels. If isolation is snapshot based, a test and read from the version store or the database may be performed (step 650). Notice that the step 650, test and read from version store or database, is similar to that performed in step 355 of FIG. 3. As before, the test and read may read from either the database or the version store depending on the time and transaction consistency of the desired data. Returning to FIG. 6, step 650 may be accomplished because the redo process (step 620) created a version of the data as it was conducting the unexecuted transactions from the log file. If isolation is locking based, the database itself may safely be used (step 645) to obtain the needed data for the query after shared locks are granted to the query.

It should be noted that the type of lock (i.e. whether it was obtained by the REDO process) may be unnecessary to test in the method 600. It is noted that the redo process (step 620) generated versions of the data as described above. It is also noted that transactions that changed data also generated versions of data such that any rows, pages, tables or indexes locked by uncommitted transactions have version store data to provide a snapshot query with information needed for read access.

Exemplary Computing Device

Figure 7:
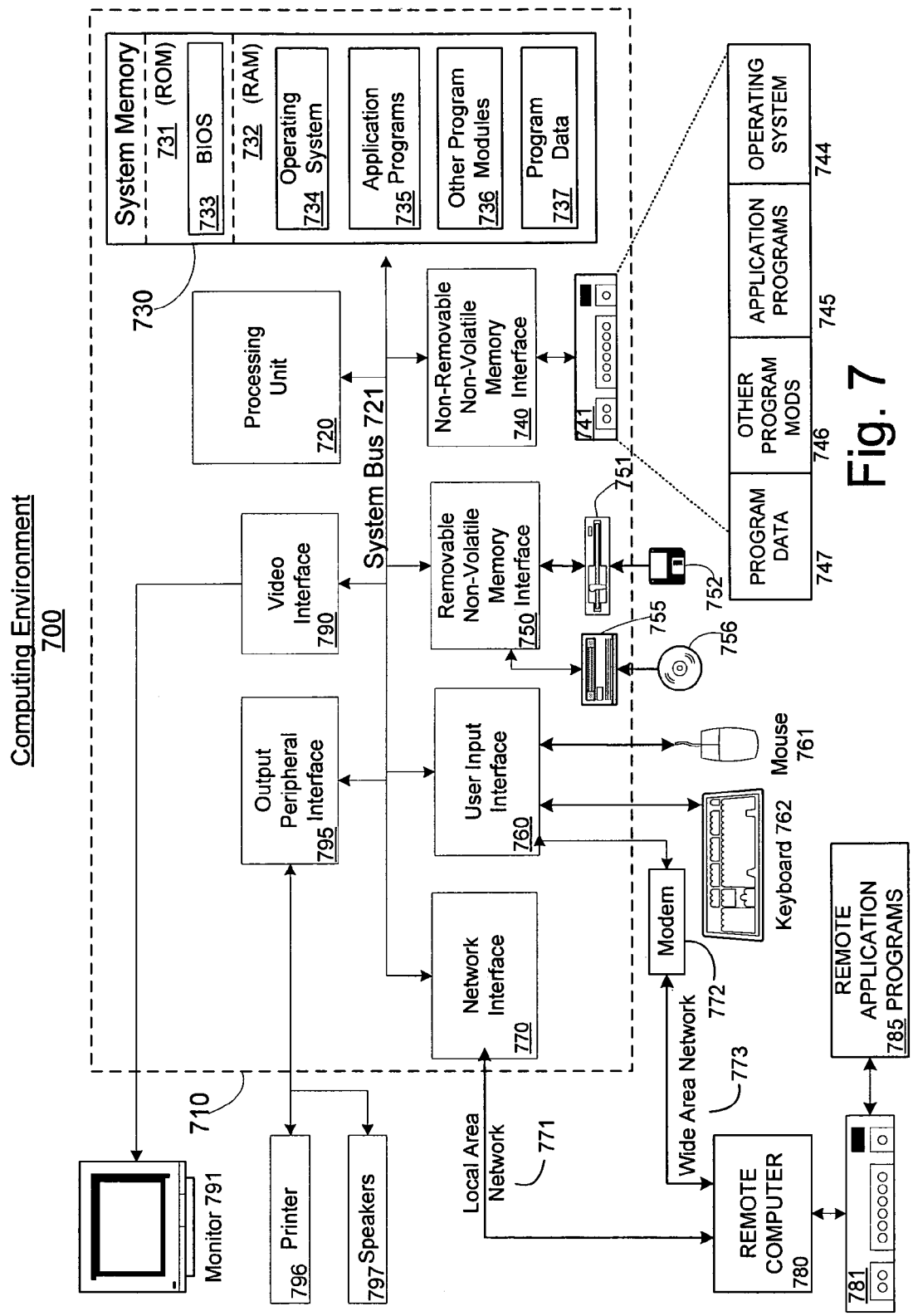
FIG. 7 is a block diagram showing an exemplary computing environment in which aspects of the invention may be implemented.

FIG. 7 and the following discussion are intended to provide a brief general description of a suitable computing environment in which embodiments of the invention may be implemented. While a general purpose computer is described below, this is but one example, and embodiments of the invention may be implemented with other computing devices, such as a client having network/bus interoperability and interaction. Thus, embodiments of the invention may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may be stored or from which data may be retrieved is a desirable, or suitable, environment for operation.

Although not required, embodiments of the invention can also be implemented via an operating system, for use by a developer of services for a device or object, and/or included within application software. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that various embodiments of the invention may be practiced with other computer configurations. Other well known computing systems, environments, and/or configurations that may be suitable for use include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. Embodiments of the invention may also be practiced in distributed computing environments where tasks are performed by remote processing devices that are linked through a communications network/bus or other data transmission medium. In a distributed computing environment, program modules may be located in both local and remote computer storage media including memory storage devices and client nodes may in turn behave as server nodes.

FIG. 7 thus illustrates an example of a suitable computing system environment 700 in which the embodiments of the invention may be implemented, although as made clear above, the computing system environment 700 is only one example of a suitable computing environment and is not intended to suggest any limitation as to the scope of use or functionality of an embodiment of the invention. Neither should the computing environment 700 be interpreted as having any dependency or requirement relating to any one or combination of components illustrated in the exemplary operating environment 700.

With reference to FIG. 7, an exemplary system for implementing an embodiment of the invention includes a general purpose computing device in the form of a computer system 710. Components of computer system 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer system 710 typically includes a variety of computer readable media. Computer readable media can be any available media that can be accessed by computer system 710 and includes both volatile and nonvolatile media, removable and non-removable media. By way of example, and not limitation, computer readable media may comprise computer storage media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (BEPROM), flash memory or other memory technology, Compact Disk Read Only Memory (CDROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can accessed by computer system 710. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer system 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736, and program data 737.

The computer system 710 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756, such as a CD ROM, CDRW, DVD, or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 7 provide storage of computer readable instructions, data structures, program modules and other data for the computer system 710. In FIG. 7, for example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies. A user may enter-commands and information into the computer system 710 through input devices such as a keyboard 762 and pointing device 761, commonly referred to as a mouse, trackball or touch pad. Other input devices (not shown) may include a microphone, joystick, game pad, satellite dish, scanner, or the like. These and other input devices are often connected to the processing unit 720 through a user input interface 760 that is coupled to the system bus 721, but may be connected by other interface and bus structures, such as a parallel port, game port or a universal serial bus (USB). A monitor 791 or other type of display device is also connected to the system bus 721 via an interface, such as a video interface 790, which may in turn communicate with video memory (not shown). In addition to monitor 791, computer systems may also include other peripheral output devices such as speakers 797 and printer 796, which may be connected through an output peripheral interface 795.

The computer system 710 may operate in a networked or distributed environment using logical connections to one or more remote computers, such as a remote computer 780. The remote computer 780 may be a personal computer, a server, a router, a network PC, a peer device or other common network node, and typically includes many or all of the elements described above relative to the computer system 710, although only a memory storage device 771 has been illustrated in FIG. 7. The logical connections depicted in FIG. 7 include a local area network (LAN) 771 and a wide area network (WAN) 773, but may also include other networks/buses. Such networking environments are commonplace in homes, offices, enterprise-wide computer networks, intranets and the Internet.

When used in a LAN networking environment, the computer system 710 is connected to the LAN 771 through a network interface or adapter 770. When used in a WAN networking environment, the computer system 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer system 710, or portions thereof, may be stored in the remote memory storage device. By way of example, and not limitation, FIG. 7 illustrates remote application programs 785 as residing on memory device 781. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET™ platform, available from Microsoft Corporation, includes servers, building-block services, such as Web-based data storage, and downloadable device software. While exemplary embodiments herein are described in connection with software residing on a computing device, one or more portions of an embodiment of the invention may also be implemented via an operating system, application programming interface (API) or a "middle man" object between any of a coprocessor, a display device and a requesting object, such that operation may be performed by, supported in or accessed via all of .NET™'s languages and services, and in other distributed computing frameworks as well.

As mentioned above, while exemplary embodiments of the invention have been described in connection with various computing devices and network architectures, the underlying concepts may be applied to any computing device or system in which it is desirable to attain access to databases during the undo phase of recovery. Thus, the methods and systems described in connection with embodiments of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by embodiments of the invention.

The various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize an embodiment of the present invention, e.g., through the use of a data processing API or the like, are preferably implemented in a high level procedural or object oriented programming language to communicate with a computer. However, the program(s) can be implemented in assembly or machine language, if desired. In any case, the language may be a compiled or interpreted language, and combined with hardware implementations.

While aspects of the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the claimed invention should not be limited to any single embodiment, but rather should be construed in breadth and scope in accordance with the appended claims.

What is claimed is:

1. A method of querying a database during database recovery, the method comprising:
   reading a log file containing log file transactions to find incomplete transactions;
   comparing the log file transactions with transactions reflected in the database to find unentered transactions;
   inserting the unentered transactions into the database;
   asserting a first lock type on a data item associated with each incomplete transaction;
   removing a transaction reflected in the database if the transaction is not committed in the log file, wherein the removal of the transaction de-asserts a first lock type on a data item associated with the incomplete transaction; and
   permitting a snapshot query of the database concurrent with the removal of an incomplete transaction, wherein if a first lock type is detected on a first data item, the snapshot query is delayed until the first lock type is de-asserted.

2. The method of claim 1, wherein the step of asserting a first lock type comprises asserting at least one of a row, a page, a table and an index.

3. The method of claim 1, wherein the step of asserting a first lock type comprises asserting a redo lock.

4. The method of claim 1, further comprising:
   permitting a snapshot query of the database concurrent with the removal of an incomplete transaction, wherein if a second lock type is detected on a second transaction, a read from a previous version of the second transaction is performed.

5. The method of claim 4, wherein the second lock type comprises one of a read and a write lock.

6. A system for querying a database during recovery of the database, the system comprising:
   a processor having access to memory, the memory having instructions of a software component; and
   a software component which, when executed:
   reads a log file containing log file transactions to find incomplete transactions;
   compares the log file transactions with transactions reflected in the database to find unentered transactions;
   performs redo operations with the unentered transactions;
   performs undo operations with uncommitted transactions;
   permits a snapshot query against the database concurrent with the undo operations; and
   tests for a lock related to a data item of the snapshot query; wherein if a lock related to a redo operation is detected, a read from a previous version of the data item is performed.

7. The system of claim 6, wherein locks are asserted upon the redo operation of one of a row, a page, a table and an index.

8. The system of claim 6, further comprising a display on which to view query results.

9. A computer-readable storage medium having computer-executable instructions for performing a method to query a database during recovery of the database, the method comprising:
   reading a log file containing log file transactions to find incomplete transactions;
   comparing the log file transactions with transactions reflected in the database to find unentered transactions;
   inserting the unentered transactions into the database;
   asserting a first lock type on a data item associated with each incomplete transaction;
   removing a transaction reflected in the database if the transaction is not committed in the log file, wherein the removal of the transaction de-asserts a first lock type on a data item associated with the incomplete transaction; and
   permitting a snapshot query of the database concurrent with the removal of an incomplete transaction, wherein if a first lock type is detected on a first data item, the snapshot query is delayed until the first lock type is de-asserted.

10. The computer-readable medium of claim 9, the method further comprising:
    permitting a snapshot query of the database concurrent with the removal of an incomplete transaction, wherein if a second lock type is detected on a second transaction, a read from a previous version of the second transaction is performed.

* * * * *